April 27, 1954  W. W. AYERS ET AL  2,676,543
MATERIAL BREAKING SHELL
Filed Dec. 1, 1950

INVENTORS
Woodrow W. Ayers
Opie K. Thompson
BY *Victor J. Evans & Co.*
ATTORNEYS Patented Apr. 27, 1954

2,676,543

UNITED STATES PATENT OFFICE 2,676,543

MATERIAL BREAKING SHELL

Woodrow W. Ayers and Opie K. Thompson, Harvey, W. Va.

Application December 1, 1950, Serial No. 198,636

1 Claim. (Cl. 102—25)

This invention relates to material-breaking apparatus, and more particularly to a coal-breaking shell which uses highly compressed air as the material-breaking medium.

The object of the invention is to provide a material-breaking shell which is constructed so that the valve will be kept in an open position after primary actuation of the air release mechanism.

Another object of the invention is to provide a material-breaking shell which is constructed so that all of the compressed air will be discharged or released from the body at one time so as to prevent "double shooting" of the shell and increase the efficiency of the apparatus.

A further object of the invention is to provide a material-breaking shell which is extremely simple and inexpensive to manufacture.

Other objects and advantages will be apparent during the course of the following description.

In the accompanying drawings forming a part of this application, and in which like numerals are used to designate like parts throughout the same:

Figure 1:
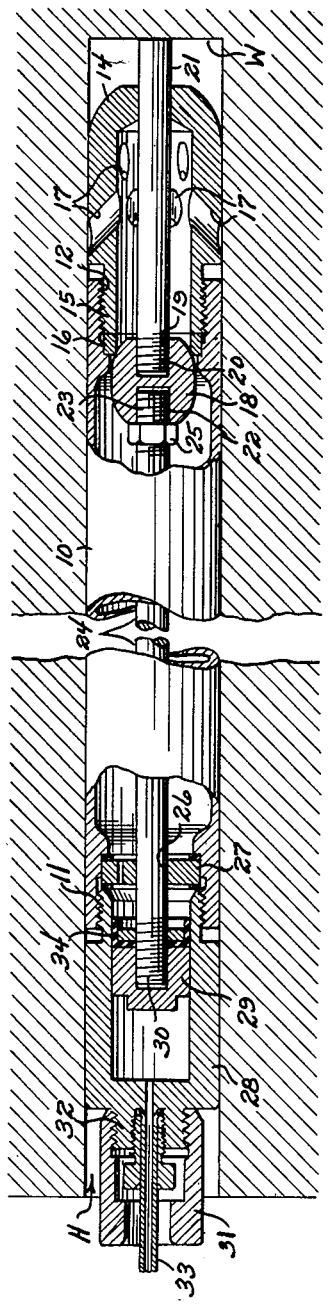
Figure 1 is a side elevational view of the material-breaking shell of the present invention, with parts broken away and shown in section.

Referring in detail to the drawings, the numeral 10 designates a hollow body which may be fabricated of any suitable material, and the body 10 has its ends threaded interiorly for a portion of their length, as at 11 and 12. A discharge cap 14 has an exteriorly threaded shoulder 15 arranged in engagement with the threaded end 12, and the discharge cap 14 is provided with a plurality of spaced, inclined passageways or openings 17. A valve seat 16 is seated in the body 10. When the shell of the present invention is discharged, the air under high pressure passes out through the passageway 17 in the cap 14 to thereby shatter or break up the coal in the vicinity of the shell, so that this coal can be conveniently handled.

Mounted for movement into and out of closing or bridging relation with respect to the valve seat 16 is a valve 18. The valve 18 is provided with a threaded socket 19, and the threaded end 20 of a rod or stem 21 threadedly engages the socket 19. When the valve 18 is in the closed position, as shown in Figure 1, the outer end of the stem 21 projects beyond the cap 14.

The valve 18 is further provided with a threaded socket 22, and arranged in threaded engagement with the socket 22 is the threaded end 23 of a piston rod 24. The piston rod 24 has a lock nut 25 mounted thereon, and the piston rod 24 slidably projects through a central opening 26 in a baffle plate 27. The baffle plate 27 is seated in the body 10.

Arranged in threaded engagement with the other end of the body 10 is a tube top 28, and slidably or reciprocably arranged in the tube top 28 in a piston 29. The other end of the piston rod 24 is threaded, as at 30, and the threaded end 30 threadedly engages the piston 29. Projecting from the tube top 28 is a threaded sleeve 32, and a nose 31 is arranged in engagement with the threaded sleeve 32. A tube 33 extends through the nose 31 and communicates with the interior of the tube cap 28. A leather cup 34 is mounted on the rod 24.

Figure 2:
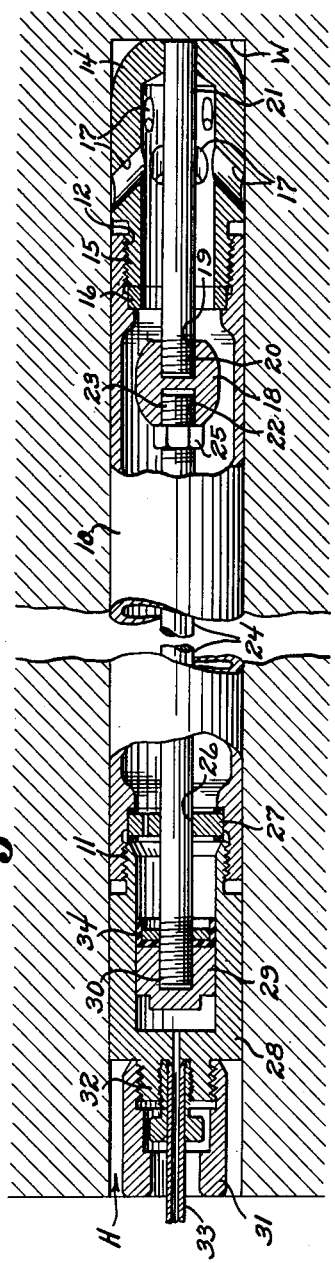
Figure 2 is a view similar to Figure 1, but showing the valve in the "open" position.

In use, the body 10 is loaded with compressed air, say at 10,000 pounds per square inch, and the parts assume the positions shown in Figure 1. Then, the shell is placed in the cavity or hole H which may be in a coal mine in such a position that the outer end of the stem 21 engages the rear wall W. Then, the air within the tube top 28 can be bled through the tube 33. This will result in a decrease in pressure in the tube top 28 so that the high pressure in the body 10 will force the piston 29 rearwardly or to the position shown in Figure 2. Then the valve 18 will move away from the seat 16, so that the high pressure air can pass from the body 10 through the valve seat 16, then into the cap 14, and out through the opening 17. This high pressure air passing through the opening 17 will cause the coal in the vicinity to be shattered or broken up so that it can be readily handled. Simultaneously, the shell will move forwardly in the hole H due to the jet action of the air passing out through the opening 17. The shell will move forwardly until the front end of the cap 14 contacts the wall W, and therefore the valve 18 will be held in its open position, thus permitting all of the air in the body 10 to discharge through the opening 17. The air for the shell of the present invention can be pumped from a central pumping station through a condlit connected to the tube 33, and a conventional valve can be arranged in this conduit in order to permit bleeding of the air.

From the foregoing, it is apparent that a material-breaking apparatus has been provided wherein "double shooting" will be eliminated. Also, the baffle plate 27 can be dispensed with if desired. The shell of the present invention can be loaded with compressed air at a central pumping station. Any suitable mechanism can be used for bleeding air through the tube 33. Also, there will be a minimum amount of repair or replacement of parts required with the shell of the present invention. It is well known in the art how to fill cartridges of this type and in this connection attention is directed to U. S. Patent No. 2,532,558.

I claim:

In a material-breaking shell, a hollow cylindrical body having interiorly threaded ends, a cap having an exteriorly threaded shoulder arranged in engagement with one of said ends, there being a plurality of spaced rearwardly inclined passageways in said cap, there being an opening arranged in the front of said cap, said body being provided with a valve seat, a valve mounted for movement into and out of closing relation with respect to said valve seat, a stem having one end connected to said valve and slidably projecting through the opening in said cap, a tube top of the same diameter as said body having a shoulder threadedly engaging the other end of said body, a piston slidably arranged in said tube top, a piston rod having one end connected to said piston and the other end connected to said valve, a baffle plate seated in said body and provided with a central opening for the slidable projection therethrough of said piston rod, a nose threadedly engaging said tube top, and a tube extending through said nose and communicating with the interior of said tube top, the outer end of said stem projecting a substantial distance beyond said cap when the valve is in closed position.

References Cited in the file of this patent

UNITED STATES PATENTS

| Number | Name | Date |
|---|---|---|
| 2,532,578 | Spencer | Dec. 5, 1950 |